United States Patent [19]

Davies et al.

[11] 3,957,695

[45] May 18, 1976

[54] DETERGENT COMPOSITIONS CONTAINING CALCIUM CARBONATE

[75] Inventors: Charles Bloor Davies, Wallasey;
James Francis Davies, Wirral;
William Fredrick Soutar Neillie,
Birkenhead, all of England

[73] Assignee: Lever Brothers Company, New York, N.Y.

[22] Filed: Aug. 8, 1973

[21] Appl. No.: 386,827

[30]  Foreign Application Priority Data
Aug. 22, 1972  United Kingdom............... 39122/72
Jan. 23, 1973  United Kingdom................ 3321/73

[52] U.S. Cl................................ 252/532; 252/135;
252/175; 252/179; 252/181; 252/526;
252/528; 252/529; 252/533; 252/539;
252/540; 252/545; 252/547; 252/551;
252/552; 252/558; 252/559; 252/DIG. 11
[51] Int. Cl.²......................................... C11D 3/065
[58] Field of Search ........... 252/532, 533, 539, 540,
252/135, 551, 558, 175, 179, 181, DIG. 11,
552, 559; 23/300 R, 304; 210/51, 54

[56] References Cited
FOREIGN PATENTS OR APPLICATIONS
2,321,001  11/1973  Germany
607,274  8/1948  United Kingdom
511,607  4/1955  Canada

*Primary Examiner*—Benjamin R. Padgett
*Assistant Examiner*—E. Suzanne Parr
*Attorney, Agent, or Firm*—James J. Farrell

[57] ABSTRACT

Detergent compositions based on sodium carbonate as a detergency builder also contain finely divided calcium carbonate having a surface area of at least about meters square metres per gram ($m^2/g$), preferably frm about 30 to 100 $m^2/g$, together with a detergent active compound or mixture of compounds which does not form during use an insoluble calcium salt. The added calcium carbonate tends to improve the detergency building action of the sodium carbonate, and so increase detergency, whilst inhibiting the tendency for the newly precipitated calcium carbonate to be deposited on the washed fabrics.

30 Claims, No Drawings

DETERGENT COMPOSITIONS CONTAINING CALCIUM CARBONATE

The invention relates to detergent compositions, and in particular to detergent compositions adapted for fabric washing.

Detergent compositions commonly incorporate as major ingredients detergent active compounds together with detergency builders. Conventional detergency builders are commonly inorganic materials, particularly the condensed phosphates, for example sodium tripolyphosphate. It has, however, been suggested that the use of phosphate detergency builders can contribute to eutrophication problems. Alternative detergency builders which have been proposed, for example sodium nitrilotriacetate (NTA) and synthetic polyelectrolyte materials, tend to be more expensive or less efficient than the phosphate detergency builders, or otherwise unsatisfactory for one reason or another.

It is known that sodium carbonate can function as a detergency builder by removing the calcium from hard water in the form of precipitated calcium carbonate. But the calcium carbonate tends to accumulate on washed fabrics, which can lead to fabric harshness, and on washing machine surfaces.

We have now found that detergent compositions containing an alkali metal carbonate detergency builder are improved by incorporating therein calcium carbonate in a finely divided form. The new compositions tend to form less inorganic deposits on washed fabrics, and hence give decreased fabric harshness, apparently because the precipitated calcium carbonate is deposited on the added calcium carbonate instead of on the fabrics or washing machines. Moreover, by encouraging the calcium hardness in the wash water to be removed from solution in this way, the detergency of the compositions is improved, compared with those detergent compositions in which inorganic deposition on the fabrics is decreased by inhibition of the precipitation process, either by the addition of anti-deposition agents or by the actions of precipitation inhibitors which we have found to be present in wash liquors. The added calcium carbonate also appears to act as a scavenger for the calcium carbonate precipitation inhibitors, which facilitates the nucleation process and increases the effect of its presence.

It was proposed many years ago to add calcium carbonate to sodium carbonate for water softening purposes prior to washing with soap. However, despite many years of effort to make sodium carbonate an effective detergency builder for non-soap detergent active compounds, it is only now that it has been discovered that by adding finely divided calcium carbonate the previously severe deficiencies of sodium carbonate as a detergency builder can be overcome in the detergent compositions of the present invention.

In addition to the alkali metal carbonate detergency builder and the calcium carbonate, the detergent compositions may include a crystallisation aid as defined hereinafter. The presence of the crystallisation aids appears to encourage the precipitation of calcium carbonate from solution and tends to improve detergency.

The alkali metal carbonate used is preferably sodium or potassium carbonate or a mixture thereof, for reasons of cost and efficiency. The carbonate salt is preferably fully neutralised, but it may be partially neutralised, for example a sesquicarbonate may be used in partial replacement of the normal carbonate salt; the partial salts tend to be less alkaline and therefore less efficient. The amount of the alkali metal carbonate in the detergent composition can be varied widely, but the amount should be at least about 10% by weight, preferably from about 20 to 60% by weight, though an amount of up to about 75% could possibly be used if desired in special products. The amount of the alkali metal carbonate is determined on an anhydrous basis, though the salts may be hydrated either before or when incorporated into the detergent composition. It should be mentioned that within the preferred range the higher levels tend to be required under conditions of use at low product concentrations, as is commonly the practice in North America, and the converse applies under conditions of use at higher product concentrations, as tends to occur in Europe. It should be noted that it may also be desirable to limit the carbonate content to a lower level within the range mentioned, so as to decrease the risk of internal damage following any accidental ingestion, for example by children.

The calcium carbonate used should be finely divided, and should have a surface area of at least about 5 square meters per gram ($m^2/g$), generally at least about 10 $m^2/g$, and preferably at least about 20 $m^2/g$. The particularly preferred calcium carbonate has a surface area of from about 30–100 $m^2/g$. Calcium carbonate with surface areas in excess of about 100 $m^2/g$ may be used, up to say 150 $m^2/g$, if such materials are economically available, but it appears to be unlikely that any higher surface areas will be achievable commercially and this may in any case be undesirable for other reasons, for example especially small particles, i.e., with very high surface areas, may have a tendency to be deposited onto fabrics during the washing process and there may be dust problems. It should be mentioned that the calcium carbonate may be adsorbed onto a substrate, in which case it may not be possible to measure accurately the surface area of the calcite alone. The effective surface area can then be deduced by checking the effectiveness of the calcium carbonate and relating this to the effectiveness of calcium carbonates of known surface areas. Alternatively, it may be possible to use electron microscopy to determine the average particle size, from which an indication of surface area might be obtained, but this should still be checked by determining the effectiveness of the calcium carbonate in use. As an indication of the general relationship between particle size and surface area, we have found that calcite with a surface area of about 50 $m^2/g$ has an average particle size (diameter) of about 250 Angstrom (A), whilst if the particle size is decreased to about 150 A the surface area increases to about 80 $m^2/g$. It is desirable that the particle size of the calcium carbonate should be fairly uniform, and in particular that there should be no appreciable quantity of large particles which could easily get trapped in the fabrics being washed or cause abrasive damage to washing machine parts.

Surface areas are determined by the standard Brunauer, Emmet and Teller (BET) method, using an AREA-meter made by Strohlein & Co., and operated according to the suppliers' instruction manual. The procedure for degassing the samples under investigation is usually left to the operator, but we have found that a degassing procedure in which the samples are heated for 2 hours at 175°C under a stream of dry nitrogen is effective to give repeatable results.

Any crystalline form of calcium carbonate may be used or a mixture thereof, but calcite is preferred as aragonite and vaterite appear to be more difficult to prepare with high surface areas, and it appears that calcite is a little less soluble than aragonite or vaterite at most usual wash temperatures. When any aragonite or vaterite are used it is generally in admixture with calcite. Calcium carbonate can be prepared conveniently by precipitation processes, for example by passing carbon dioxide into a suspension of calcium hydroxide, in which case it may be convenient to use the resultant aqueous slurry of calcium carbonate when preparing the detergent composition, as the drying process may tend to encourage aggregation of the calcium carbonate particles which decreases their efficiency. Thus, it may be possible to form a slurry of calcium carbonate and then to add other ingredients to form a detergent slurry which can be used to produce a detergent composition by conventional spray drying. Other chemical precipitation reactions may be employed to produce the calcium carbonate, especially the reaction between any soluble calcium salt and any soluble carbonate salt, for example by reaction between calcium sulphate or calcium hydroxide and sodium carbonate, but these reactions form aqueous slurries containing undesirable dissolved salts, i.e., sodium sulphate and sodium hydroxide in the examples mentioned, which means that the calcium carbonate would have to be filtered from the slurry before use unless the dissolved salts could be tolerated in the detergent compositions. Finely divided calcium carbonate may also be prepared by grinding minerals such as limestone or chalk, but this is not preferred as it is difficult to obtain a high-enough surface area. Suitable forms of calcium carbonate, especially calcite, are commercially available. The calcium carbonate is preferably in substantially pure form, but this is not essential and the calcium carbonate used may contain minor amounts of other cations with or without other anions or water molecules.

The amount of calcium carbonate used in the compositions should be from about 5% and preferably at least about 10 up to about 60%, more preferably from about 20 to about 50%, by weight, particularly from about 25 to 40% by weight of the detergent compositions. Within the broad range, the lower levels of calcium carbonate may be satisfactory under certain conditions of use when the calcium carbonate is particularly effective or when a crystallisation aid is also present in the composition. However, in the absence of a crystallisation aid, and especially under conditions of use at low product concentration, as for example under typical North American washing conditions, it is preferred to use higher levels of calcium carbonate within the preferred range mentioned. The surface area of the calcium carbonate very markedly affects its properties, with high surface area materials being more effective, so that lower levels or such materials can be used in comparison with calcium carbonate of low surface area.

It should be mentioned that the calcium carbonate could, of course, be added directly to the wash liquor, instead of being included with all the other ingredients in the detergent composition, and the effect is similar provided that the calcium carbonate is added to the wash liquor soon after the other ingredients. In this case the amount of calcium carbonate could be higher in relation to the total amount of the detergent composition, but the benefit due to the presence of the calcium carbonate does not appear to increase proportionately above the amounts indicated above. In either case, the calcium carbonate and other detergent ingredients should of course be dispersed thoroughly in the wash liquor before adding the articles to be washed.

The crystallisation aids which can be used in the compositions, are, as already mentioned, materials which appear to encourage the precipitation of calcium carbonate. However, the main benefit of adding the crystallisation aids is in facilitating the use of lower levels of calcite than would otherwise be necessary to give satisfactory detergency. The method for determining whether or not a material is an effective crystallisation aid involves measuring the calcium ion concentration in aqueous solution, after the precipitation of calcium carbonate under standard conditions in the presence of the material. This is because the presence of crystallisation aids gives lower calcium ion concentrations that are otherwise found, possibly because of the influence of the crystallisation aid on the form of calcium carbonate precipitate, as some crystalline forms appear to have different solubilities, depending on the conditions met. It should be mentioned that the effect of crystallisation aids appears to be less marked at higher temperatures and under conditions of vigorous agitation as met in many domestic washing machines.

The test procedure for determining whether or not a material is a crystallisation aid is as follows:

TEST FOR CRYSTALLISATION AIDS

An aqueous solution is prepared containing 0.045% by weight of sodium carbonate, 0.05% by weight of calcite (Calofort U50 supplied by J. and E. Sturge Limited, of Birmingham, England) having a nominal surface area of about 50 $m^2/g$, and 0.005% by weight of the material under test, together with two parts per million of sodium tripolyphosphate (STP) in water containing 12° (French) Ca hardness at pH 10.2, by admixture of stock solutions. STP is a strong inhibitor for calcite formation, and is added to represent the precipitation inhibitors which we have found to be generally present in domestic wash liquors. A Corning calcium ion electrode is then immersed in this solution at 25°C. This electrode responds to calcium ion activity in solution, and develops an electrical potential across the liquid interface of a water-insoluble organic ion-exchange liquid and an aqueous test solution. The liquid is a calcium salt of an organic phosphoric acid which exhibits very high specificity for calcium ions. The electrode is used in conjunction with a calomel reference electrode, and the differential potential generated is determined and related to those of standard solutions to find the free calcium ion concentration in the solution under test.

In the absence of any crystallisation aid in the test, the calcium ion concentration after two minutes is about $1.25 \times 10^{-4}$, and after about 12 minutes the calcium ion concentration falls to about $6 \times 10^{-5}$. In the presence of an effective crystallisation aid the calcium ion concentration is desirably not more than about $1 \times 10^{-4}$ after two minutes, and not more than about $4 \times 10^{-5}$ after 12 minutes. However, with the better crystallisation aids the calcium ion concentration can be less than about $4 \times 10^{-5}$ after two minutes, and as little as about $1 \times 10^{-5}$ after 12 minutes. With such low calcium ion concentrations in wash solutions it is possible to get good detergency figures. By way of comparison, it may be noted that without the calcite present in this test, and without any crystallisation aid, the calcium ion concentration is lowered to only about $3 \times 10^{-4}$ because of the inhibiting effect of the STP on calcium carbonate precipitation.

Whilst for the purpose of determining whether or not a material is an effective crystallisation aid the material is used at a level of 0.005% by weight in solution, which is equivalent to an amount of 5% by weight of the crystallisation aid in a detergent composition used at a concentration of 0.1%, the amount of the crystallisation aids used in practical detergent compositions can vary from about 0.5 to 20% by weight, depending on cost and performance considerations. In particular, the amount of the crystallisation aid is preferably at least about 10% by weight of the amount of calcium carbonate present in the compositions.

It should be mentioned that if, for any reason, the specific calcite (i.e., Calofort U50) is not available for use in the test, another calcite having a surface area within the range of about 30–100 $m^2/g$ may be used. Clearly the same levels of calcium ion concentration may not be obtained, but crystallisation aids can still be identified readily as being any materials which cause a lowering of calcium ion concentration in this test, apart of course from any other detergency builders which sequester or precipitate calcium on their own more effectively than the sodium carbonate/calcite system.

Examples of effective crystallisation aids and the calcium ion concentrations given by them under the conditions of the test described above are shown in Table I below.

TABLE 1

| Crystallisation Aid[1] | $Ca^{2+}$ after 2 minutes | $Ca^{2+}$ after 12 minutes |
|---|---|---|
| Phenol | $3.2 \times 10^{-5}$ | $<1 \times 10^{-5*}$ |
| Octanol | $3.5 \times 10^{-5}$ | $<1 \times 10^{-5*}$ |
| Decanol | $3.9 \times 10^{-5}$ | $<1 \times 10^{-5*}$ |
| 1-Naphthol | $4.0 \times 10^{-5}$ | $<1 \times 10^{-5*}$ |
| Salicylic acid | $4.0 \times 10^{-5}$ | $<1 \times 10^{-5*}$ |
| Oxine | $4.0 \times 10^{-5}$ | $<1 \times 10^{-5*}$ |
| 2-Naphthol | $4.3 \times 10^{-5}$ | $<1 \times 10^{-5*}$ |
| Oxidised starch[2] | $5.3 \times 10^{-5}$ | $<1 \times 10^{-5*}$ |
| Tergitol 15-S-3[3] | $6.0 \times 10^{-5}$ | $<1 \times 10^{-5*}$ |
| Sodium lignosulphonate[4] | $8.0 \times 10^{-5}$ | $<1 \times 10^{-5*}$ |
| Polystyrene latex | $2.7 \times 10^{-5}$ | $1.0 \times 10^{-5}$ |
| Benzoic acid | $4.6 \times 10^{-5}$ | $1.0 \times 10^{-5}$ |
| Phenyl-ethane-1,2-diol | $6.0 \times 10^{-5}$ | $1.0 \times 10^{-5}$ |
| Anthraquinone | $7.4 \times 10^{-5}$ | $1.0 \times 10^{-5}$ |
| Dipicolinic acid | $3.2 \times 10^{-5}$ | $1.1 \times 10^{-5}$ |
| Glycine | $5.0 \times 10^{-5}$ | $1.3 \times 10^{-5}$ |
| Pyridine N-oxide | $6.0 \times 10^{-5}$ | $1.3 \times 10^{-5}$ |
| Chelidamic acid | $5.5 \times 10^{-5}$ | $1.5 \times 10^{-5}$ |
| Cholesterol | $6.0 \times 10^{-5}$ | $1.6 \times 10^{-5}$ |
| Citric acid | $5.5 \times 10^{-5}$ | $1.8 \times 10^{-5}$ |
| Tartaric acid | $6.0 \times 10^{-5}$ | $1.8 \times 10^{-5}$ |
| Anthracene | $4.8 \times 10^{-5}$ | $2.0 \times 10^{-5}$ |
| Mandelic acid | $5.0 \times 10^{-5}$ | $2.1 \times 10^{-5}$ |
| Terephthalic acid | $5.0 \times 10^{-5}$ | $2.2 \times 10^{-5}$ |
| Polyvinyl alcohol | $6.3 \times 10^{-5}$ | $2.3 \times 10^{-5}$ |
| Phenanthrene | $7.0 \times 10^{-5}$ | $2.3 \times 10^{-5}$ |
| Phenanthraquinone | $8.7 \times 10^{-5}$ | $2.3 \times 10^{-5}$ |
| Acetic acid | $5.6 \times 10^{-5}$ | $2.4 \times 10^{-5}$ |
| Benzyl alcohol | $8.0 \times 10^{-5}$ | $2.4 \times 10^{-5}$ |
| Catechol | $5.0 \times 10^{-5}$ | $2.5 \times 10^{-5}$ |
| Formic acid | $6.5 \times 10^{-5}$ | $2.5 \times 10^{-5}$ |
| Nicotinic acid | $6.5 \times 10^{-5}$ | $2.5 \times 10^{-5}$ |
| Acetoacetic acid | $6.6 \times 10^{-5}$ | $2.5 \times 10^{-5}$ |
| Toluic acid | $6.6 \times 10^{-5}$ | $2.8 \times 10^{-5}$ |
| Phthalic acid | $7.0 \times 10^{-5}$ | $2.8 \times 10^{-5}$ |
| Pyridine tricarboxylic acid | $8.1 \times 10^{-5}$ | $2.8 \times 10^{-5}$ |
| Naphthoic acid | $7.0 \times 10^{-5}$ | $2.9 \times 10^{-5}$ |
| Iso-phthalic acid | $7.6 \times 10^{-5}$ | $3.2 \times 10^{-5}$ |

TABLE 1-continued

| Crystallisation Aid[1] | $Ca^{2+}$ after 2 minutes | $Ca^{2+}$ after 12 minutes |
|---|---|---|
| Phenyl acetic acid | $6.0 \times 10^{-5}$ | $3.3 \times 10^{-5}$ |

[1]The organic acids will be present in salt form in alkaline detergent compositions
[2]Starch with 70–90% of the anhydroglucose rings opened by oxidation at the 2:3 position to form dicarboxyl units
[3]Secondary $C_{11}$-$C_{15}$ alcohol — 3 ethylene oxide (EO) condensate, supplied by Union Carbide
[4]Polyfon H, supplied by Westvaco (½ mole sulphonate per lignin unit of MW 940)

*$1 \times 10^{-5}$ is the practical lower limit for the electrode used

It should be pointed out that although many materials have been shown to be effective crystallisation aids, a large number of similar materials have been found not to function as crystallisation aids, so it is not possible to describe by their chemical characteristics those materials which are effective. In particular, for example, calcium sequestering power cannot be related directly to the crystallisation aid effect, as for example sodium nitrilotriacetate has been found not to be effective whilst dipicolinic acid which is also a strong sequestrant is highly effective. It is, however, noted that the presence of an aromatic ring in the compound appears to be advantageous, whereas the presence of more than one ionisable group tends to make compounds less effective.

In addition to the essential sodium or potassium carbonate and finely divided calcium carbonate, and any optional crystallisation aid as described above, it is necessary to include in the detergent compositions of the present invention an amount of a nonionic, anionic, cationic, amphoteric or zwitterionic detergent active compound, or a mixture thereof. It is necessary that the detergent active compound or compounds used should not form during use at normal product concentration in hard water excessively water-insoluble calcium salts; this ensures that the detergent active compound is not completely precipitated as its calcium salt instead of calcium carbonate being precipitated. Some degree of precipitation of the detergent active compound or mixture of compounds in the form of the calcium salts may be tolerated, provided that after allowing for the subsequent redissolution of any of the calcium salt during the washing process, the amount of any more premanent precipitate is minor and an effective amount of detergent active compound is left in solution. Thus, the detergent active compound should not be wholly soap, which if added with the sodium carbonate and calcium carbonate would tend to be precipitated too rapidly in the form of its calcium soap, and calcium tallow soap is so insoluble that it does not revert subsequently to the sodium soap, because the calcium soap is less soluble than the calcium carbonate (as measured by the free $Ca^{++}$ concentration). However, a little soap may be present with other detergent active compounds, as for example in binary or ternary active low sudsing products, where the presence of the soap influences the lather properties, though it does not act as a detergent active compound after precipitation as the calcium soap.

Many suitable synthetic detergent active compounds are commercially available and they are fully described in the literature, for example in "Surface Active Agents and Detergents" Volumes 1 and 2, by Schwartz, Perry & Berch. Preferred detergent active compounds which can be used include non-ionic detergent active compounds which are not calcium sensitive, and anionic detergent active compounds which either form water-soluble calcium salts, as for example with certain alkyl ether sulphates, or which tend to form only slightly insoluble calcium salts when used alone but which are used in conjunction with other solubilising compounds, especially other detergent active compounds, for example mixtures of certain alkyl benzene sulphonates with nonionic detergent active compounds, and some mixed olefin sulphonates of which some of the olefin sulphonate constituents appear to act as solubilising agents for the other less-soluble constituents.

Specific nonionic detergent active compounds which can be used in the compositions of the invention include ethoxylated fatty alcohols, preferably linear primary or secondary monohydric alcohols with $C_{10}$–$C_{18}$, preferably $C_{10}$–$C_{15}$, alkyl groups and about 5–15, preferably 7–12, ethylene oxide (EO) units per molecule, and ethoxylated alkylphenols with $C_8$–$C_{16}$ alkyl groups, preferably $C_8$–$C_9$ alkyl groups, and from about 4–12 EO units per molecule. The nonionic compounds are often used in admixture with minor amounts of other detergent active compounds, especially anionic compounds, to modify the lather characteristics and powder properties; it may also be noted that low levels (about 1–10%) of sodium tallow soap or other long-chain (at least $C_{16}$) anionic compounds which do form insoluble calcium salts have been found in particular to be beneficial with nonionic detergent active compounds, as they tend to decrease calcium carbonate deposition onto cotton fabrics, and also give some fabric softening effect, whereas with nonionic compounds alone there can be higher deposition than desirable with some fabric harshening. Mixtures of nonionic compounds with amine oxides can also give good results. It should be mentioned that some nonionic compounds are also effective crystallisation aids, but such compounds tend to have poor detergent properties and lather depressant characteristics.

The preferred anionic detergent active compounds which form either soluble or only slightly insoluble calcium salts, are alkyl ($C_{10}$–$C_{18}$, preferably about $C_{14}$) sulphates and alkyl ($C_{10}$–$C_{18}$) ether (1–10 EO) sulphates, particularly those with $C_{10}$–$C_{15}$ alkyl groups and 1–7 EO and tallow alcohol 1–5 EO sulphates, and olefin sulphonate detergent active compounds, which latter term is herein used to mean the mixture of anionic detergent active compounds obtained when the products of the sulphonation of olefins are neutralised and hydrolysed. Instead of hydrolysis the initial reaction product may be reacted with a lower alcohol before neutralisation to form a proportion of an alkoxy alkane sulphonate in admixture with the residue of the olefin sulphonate product. The olefins used are preferably linear $C_{12}$–$C_{20}$ alpha-olefins, particularly $C_{14}$–$C_{16}$ alpha-olefins, produced for example by the "cracked wax" process or by the "Zeigler" process, but localised internal, random or so-called vinnylidene olefins may alternatively be used. The anionic detergent active compounds are used in the form of the alkali metal, ammonium or substituted ammonium salts, preferably the sodium salts.

Other detergent active compounds which do not form insoluble calcium salts, but which are of less commercial interest, include salts of esters of alpha-sulphonated ($C_{10}$–$C_{20}$) fatty acids with $C_1$–$C_{10}$ alcohols, preferably $C_1$–$C_3$ alcohols; salts of 2-acyloxy-alkane-1-sulphonic acids, particularly wherein the alkyl group contains from about 10–22, preferably 12–16 carbon atoms, and the ester forming group contains from 1–8 carbon atoms; trialkyl amine oxides having a $C_{10}$–$C_{22}$ alkyl group, and two $C_1$–$C_4$ alkyl or $C_2$–$C_3$ hydroxyalkyl groups; and dialkyl sulphoxides having a $C_{10}$–$C_{22}$ alkyl group and a $C_1$–$C_4$ alkyl or $C_2$–$C_3$ hydroxyalkyl group, together with detergent active betaines and sulphobetaines, for example lauryl dimethyl ammonio propane sulphonate. Cationic detergent compounds such as quaternary ammonium compounds may also be used, but they are of much less commercial interest.

As stated earlier, mixtures of some detergent active compounds can give particularly good results. Specifically, some alkyl benzene sulphonates (which when used alone tend to form slightly insoluble calcium salts) can be used with minor amounts of certain solubilising compounds, such as nonionic, alkyl sulphate or alkyl ether sulphate detergent active compounds, to give good detergent properties and be relatively economical. The ratio by weight of such solubilising compounds to the alkyl benzene sulphonate is preferably from about 1:1 to 1:10, especially about 1:2 to 1:8. It should, however, be added that linear secondary ($C_{11}$–$C_{15}$) alkyl benzene sulphonates do have very good detergencies in this system and can be used alone, preferably in higher amounts which compensate for any tendency for initial precipitation of some of the detergent active compound, or with calcium carbonates of higher surface area which are more effective at lowering calcium ion concentration quickly. These alkyl benzene sulphonates also tend to be effective in lowering slurry viscosity whereas some others have the opposite effect. It may be noted that alkali metal tetra- and pentapropylene benzene sulphonates form more highly insoluble calcium salts and are therefore less satisfactory in this respect. The presence of calcium carbonate together with the alkali metal carbonate in the detergent compositions of the present invention enables lower calcium ion concentrations to be achieved in use than would be obtained with the latter alone, so that any calcium salts of alkyl benzene sulphonic acid which are precipitated initially may be redissolved during the subsequent washing process to liberate the active detergent compound, i.e. as the calcium ion concentration drops during the calcium carbonate precipitation.

The effective amount of the detergent active compound or compounds used in the compositions of the present invention is generally in the range of from about 5 to 40% by weight, preferably from about 10 to about 25% by weight of the composition. It may be noted that the choice of the detergent active compound or compounds used and their amounts appear to influence the precipitation of calcium carbonate, and hence can have a very marked affect both on detergency and on fabric deposition. For example, whilst alkyl benzene sulphonates appear under some circumstances to encourage the precipitation of calcium carbonate in the form of vaterite, most other detergent active compounds, for example alkyl and alkyl ether sulphates, non-ionic compounds and amine oxides, appear to encourage the formation of some calcite. The type of detergent active compounds used therefore influences the optimum level and type of added calcium carbonate, but in general it is best to use calcite of highest surface area, commensurate with cost considerations, at the minimum level to give satisfactory detergency and adequate inorganic deposition control, bearing in mind the necessity to leave sufficient "room" in the detergent compositions for other essential and optional ingredients. Excessively high levels of calcium carbonate are also undesirable as it can sometimes contribute to inorganic deposition under adverse washing conditions.

In addition to the essential alkali metal carbonate and the calcium carbonate it is possible to include minor amounts of other detergency builders, provided that the total amount of the detergency builders does not exceed about 85% by weight, so as to leave room in the detergent compositions for other essential ingredients. One such detergency building ingredient is an alkali metal silicate, particularly sodium neutral, alkaline, meta- or orthosilicate. A low level of silicate, for example about 5–10% by weight, is usually advantageous in decreasing the corrosion of metal parts in fabric washing machines, and it may give processing benefits. If higher levels of silicate are used up to a practical maximum of about 30%, for example from about 10 to 20% by weight, there can be a more noticeable improvement in detergency, which may permit some decrease in the alkali metal carbonate content. This effect appears to be particularly beneficial when the compositions are used in water with appreciable levels of magnesium hardness. The amount of silicate can also be used to some extent to control the pH of the composition, which is generally within the range of about 9–11, preferably 10–11 for an aqueous solution of the composition at the recommended concentration. It should be noted that a higher pH (i.e. over about pH 10.5) tends to be more efficient as regards detergency, but it may be less desirable for domestic safety. Sodium silicate is commonly supplied in concentrated aqueous solution, but the amounts are calculated on an anhydrous basis.

Other detergency builders can be present in minor amounts if desired, for example other so-called precipitant builders which form insoluble calcium salts, such as the sodium salts of long-chain alpha-sulphonated monocarboxylic acids, and alkali metal salts of alkyl and alkenyl succinic and malonic acids, and analogous compounds, some of which can have a desirable fabric softening effect, or some sequestrant builders, especially weak sequestrant builders such as sodium citrate. It should be noted, however, that some detergency builders, especially certain strong sequestrants such as sodium polyacrylate and other polymeric polycarboxylate builders, and certain organic precipitant builders such as sodium α-sulpho tallow fatty acids, can have a marked detrimental effect on calcium carbonate precipitation; in the case of the latter organic precipitant builders which are also softening agents, it may be noted that they can be added in calcium salt form where they do not inhibit calcium carbonate precipitation and still retain softening properties. Also, sodium tripolyphosphate is a particularly strong calcium carbonate precipitation inhibitor, and it is desirable to exclude its presence from the compositions of the invention, quite apart from eutrophication considerations. In practice, due to plant contamination, its presence at low levels of, say, up to about 0.5% by weight may be unavoidable in the detergent compositions; and in wash liquors additional phosphate may be introduced from clothes previously washed in phosphate-built detergent products.

Apart from the detergent active compounds and detergency builders, a detergent composition of the invention can contain any of the conventional additives in the amounts in which such additives are normally employed in fabric washing detergent compositions. Examples of these additives include lather boosters such as alkanolamides, particularly the monoethanolamides derived from palm kernel fatty acids and coconut fatty acids, lather depressants, anti-redeposition agents, such as sodium carboxymethylcellulose, oxygen-releasing bleaching agents such as sodium perborate and sodium percarbonate, peracid bleach precursors, chlorine-releasing bleaching agents such as trichloroisocyanuric acid and alkali metal salts of dichloroisocyanuric acid, fabric softening agents, inorganic salts such as sodium sulphate, and, usually present in very minor amounts, fluorescent agents, perfumes, enzymes such as proteases and amylases, germicides and colourants.

The detergent compositions of the invention may take any of the common physical forms associated with fabric washing detergent compositions, such as powders, granules, cakes and liquids. They may also be produced by any of the techniques commonly employed in the manufacture of fabric washing detergent compositions, including particularly slurry-making and spray drying processes, for the manufacture of detergent powders. However, the fine powder form of the calcium carbonate when dry may necessitate steps to control dustiness.

The invention is illustrated by the following Examples in which parts and percentages are by weight except where otherwise indicated, and hardness figures given are in degrees of French hardness. Distilled water was used to make all the compositions.

EXAMPLES 1 and 2

Three detergent compositions including a comparative product A were made by admixture of the ingredients and the compositions were used to wash a variety of domestically-soiled halved articles, and the washed articles were then compared for appearance against the halved articles washed in a comparative commercially available conventional sodium tripolyphosphate-built detergent composition. The wash solutions contained the levels of ingredients shown below, with the free calcium hardness levels measured in the wash liquors (total product concentration 0.2%).

| Ingredients | % in wash solution | | |
|---|---|---|---|
| | Example 1 | Example 2 | Product A |
| Sodium sec-linear alkyl ($C_{12}$–$C_{15}$) benzene sulphonate | 0.03 | 0.03 | 0.03 |
| Sodium carbonate | 0.0675 | 0.0675 | 0.0675 |
| Calcite (Calofort U50)[2] | 0.075 | 0.075 | — |
| Sodium benzoate | — | 0.015 | — |
| Calcium hardness (after 10 minutes) | 1°H | 0.8°H | 3°H |

[1]Prepared from Monsanto Alkylate 230 (this was used in all the Examples except where otherwise indicated)
[2]Average particle size about 260A, and nominal surface area about 50 m²/g (35–45 m²/g determined by BET method in different batches), obtained from J. and E. Sturge Limited, Birmingham, England. Except where otherwise indicated the same calcite was used throughout the Examples.

The washing machine tests were conducted using RCA Whirlpool machines with 6° $Ca^{++}$ hardness water at 50°C. The results of the examination of the halved articles showed a significant preference overall for the composition of Example 2 over both the compositions of Example 1 and over the comparative sodium tripolyphosphate-built composition. For washing polyester/cotton pillowcases and cotton pillowcases the composition of Example 1 was still significantly preferred to the comparative composition, though well behind Example 2, but on cotton towels and nylon socks the composition of Example 1 was slightly inferior to the comparative composition. Product A gave worse results than either of Examples 1 and 2 or the comparative sodium tripolyphosphate-built composition.

EXAMPLE 3

Two detergent compositions were prepared for determining the extent of inorganic deposition on the internal surfaces of a domestic washing machine, but only one of the compositions included calcite in accordance with the present invention. The compositions were used in a Whirlpool washing machine run on its normal washing cycle using water of 12° $Ca^{2+}$ hardness and 4° $Mg^{2+}$ hardness at 50°C, giving wash solutions containing the following levels of ingredients (product concentration 0.2%):

| Ingredients | % in wash solution | |
|---|---|---|
| | Example 3 | Product B |
| Tergitol 15-S-9 (sec-alcohol ($C_{11}$–$C_{15}$) - 9EO) | 0.018 | 0.018 |
| Sodium carbonate | 0.0675 | 0.0675 |
| Calcite (Calofort U50) | 0.075 | — |

The whole washing cycle was repeated 30 times and then the machine was dismantled to check the level of calcium carbonate deposits on the working parts. It was found that with Example 3 there was only a very slight deposition of calcium carbonate whereas with the comparative product B there were heavy incrusted deposits of calcium carbonate which would cause severe maintenance problems in domestic use. The addition of 5% of Polyfon H to Example 3 was found to give even lower calcium carbonate deposition.

EXAMPLES 4 and 5

Three detergent compositions including a comparative product C were prepared by admixture of the ingredients and tested as described for Example 3. The wash solutions contained the following levels of ingredients (product concentration 0.2%):

| Ingredients | % in wash solution | | |
|---|---|---|---|
| | Example 4 | Example 5 | Product C |
| Sodium sec-linear alkyl ($C_{12}$–$C_{15}$) benzene sulphonate | 0.03 | 0.03 | 0.03 |
| Sodium carbonate | 0.0675 | 0.0675 | 0.0675 |
| Calcite (Calofort U50) | 0.075 | 0.075 | — |
| Sodium benzoate | 0.0075 | — | — |

After 30 wash cycles it was found that the calcium carbonate deposits using Examples 4 and 5 were negligible but product C gave incrusted deposits on the washing machine parts.

EXAMPLES 6 and 7

Three detergent compositions including a comparative product D were prepared by admixture of the following ingredients:

| Ingredients | % in Example 6 | % in Example 7 | % in Product D |
|---|---|---|---|
| Sodium sec-linear alkyl ($C_{12}$–$C_{15}$) benzene sulphonate | 15 | 15 | 15 |
| Sodium carbonate | 34 | 34 | 34 |
| Calcite (Calofort U50) | 37.5 | 37.5 | — |
| Phenol | 3.75 | — | — |
| Water | ←——— to 100 ———→ | | |

These products were evaluated for their inorganic deposition on cotton terry towelling in Terg-O-Tometer washing tests using 12°H $Ca^{++}$ water at 50°C and a product concentration of 0.2%. The levels of inorganic deposits after 10 and 20 wash cycles were as follows:

| | % inorganic deposits | | |
|---|---|---|---|
| | Example 6 | Example 7 | Product D |
| 10 wash cycles | 1.9 | 1.2 | 5.9 |
| 20 wash cycles | 2.3 | 2.7 | 10.4 |

The benefit for the presence of the calcite is readily apparent.

EXAMPLE 8

A detergent composition was prepared to the formulation of Example 7 except that the detergent active compound used was Tergitol 15-S-9. This composition was then evaluated for inorganic deposition on fabric by washing a single piece of cotton terry towelling alone in a Whirlpool washing machine using 12°H $Ca^{++}$ water at 50°C and a product concentration of 0.2%. Under these particularly severe conditions an inorganic deposit of 7.6% built up on the fabric after 20 wash cycles, whereas for a comparative product not containing the calcite the inorganic deposit was as high as 19.5% after 20 wash cycles. It should of course be appreciated that unless the calcium carbonate precipitation is prevented which decreases the detergency, total prevention of inorganic deposition is almost impossible, the actual level being influenced by many factors besides the composition itself, including fabric type and its previous wash history, and physical wash conditions such as agitation and temperature.

EXAMPLE 9

Two detergent compositions were prepared to the following formulations:

| Ingredients | % in Example 9 | % in Product E |
|---|---|---|
| Sodium sec-linear alkyl ($C_{12}$–$C_{15}$) benzene sulphonate | 15 | 15 |
| Sodium carbonate | 34 | 34 |
| Calcite (Calofort U50) | 37.5 | — |
| Water | to 100 | to 100 |

A 7lb load of domestically-soiled articles was washed with these compositions in a Whirlpool washing machine using water of 12°H $Ca^{++}$ and 4°H $Mg^{++}$ at 50°C and a 0.2% product concentration, the soiled articles being added to the wash liquor immediately before the compositions were added in each case, instead of the usual recommended procedure wherein the soiled articles are added to the wash liquor after the detergent composition has been added and well dispersed therein. After 10 and 20 wash cycles the levels of inorganic deposits on cotton terry towelling using Example 9 was 0.75 and 1.19% respectively, whereas for product E the inorganic deposition was 5.89 and 20.35% respectively, under these severe washing conditions.

The compositions of Example 9 and product E were further tested for inorganic deposition as described above except that the water used contained 12°H $Ca^{++}$ only (i.e. no Mg hardness). The inorganic deposition results on cotton terry towelling and polyester/cotton sheeting were as follows:

| Terry towelling | % inorganic deposit after 3, 5 and 10 wash cycles | | |
|---|---|---|---|
| | 3 | 5 | 10 |
| Example 9 | 0.42 | 0.46 | 0.63 |
| Product E | 1.75 | 10.83 | 16.82 |
| Polyester/cotton | | | |
| Example 9 | — | 0.75 | 0.81 |
| Product E | — | 2.57 | 6.35 |

The detergent compositions of Example 9 and product E were also compared for detergency against a commercially available conventional sodium tripolyphosphate-built detergent powder F. This test was a 3-way comparison of washing halved, domestically-soiled articles in a Whirlpool washing machine using a 0.2% product concentration and various conditions of water hardness and temperature. The results showed that with 6°H $Ca^{++}$ water at 50°C, the articles washed with the composition of Example 9 were significantly preferred to those of the comparative product F, which was in turn preferred over product E. With 12°H $Ca^{++}$ water, at 50°C, the same order of preference was obtained; but on lowering the temperature to 40°C, the comparative product F was preferred to Example 9, with the product E again giving much inferior results.

EXAMPLE 10

Two detergent compositions were prepared to the following formulations:

| Ingredients | % in Example 10 | % in Product G |
|---|---|---|
| Tergitol 15-S-9 | 9 | 9 |
| Sodium carbonate | 34 | 34 |
| Calcite (Calofort U50) | 37.5 | — |
| Water | to 100 | to 100 |

These compositions were then tested for inorganic deposition on fabrics, using the procedure of Example 9 with 12°H $Ca^{++}$ water. The results were as follows:

| Terry towelling | % inorganic deposit after 5 and 10 wash cycles | |
|---|---|---|
| | 5 | 10 |
| Product G | 3.10 | 14.85 |
| Example 10 | 2.97 | 3.61 |
| Polyester/cotton | | |
| Product G | 4.13 | 5.35 |
| Example 10 | 0.99 | 1.20 |

EXAMPLES 11 to 14

Four detergent compositions were prepared to the following formulations:

| Ingredients | % in Example 11 | % in Example 12 | % in Example 13 | % in Example 14 |
|---|---|---|---|---|
| Sodium sec-linear alkyl ($C_{12}$–$C_{15}$) benzene sulphonate | 12 | — | — | — |
| Tergitol 15-S-9 | 3 | — | — | — |
| Sodium alkyl sulfate[1] | — | 15 | — | — |
| Sodium tallow alkyl sulphate | — | — | 15 | — |
| Hexadecyl dimethyl ammonio propane sulphonate | — | — | — | 15 |
| Sodium carbonate | 34 | 34 | 34 | 34 |
| Calcite (Calofort U50) | 37.5 | 37.5 | 37.5 | 37.5 |
| Water | ← to 100 → | | | |

[1]Prepared from Dobanol 45, a primary OXO alcohol ($C_{14}$–$C_{15}$)

The compositions were then tested for inorganic deposition on cotton terry towelling using the procedure of Example 10, with the following results after 3 wash cycles:

| | % inorganic deposit |
|---|---|
| Example 11 | 0.34 |
| EXample 12 | 0.50 |
| Example 13 | 0.78 |
| Example 14 | 0.56 |

Further halved article detergency test at 50°C with the products of Examples 11 to 14 showed general equivalence in washing performance with a conventional sodium tripolyphosphate-built product.

EXAMPLES 15 to 17

A series of detergent compositions were prepared by admixture of the various ingredients and wash solutions were then prepared with the following concentrations of the ingredients (product concentration 0.15%):

| | % in wash solution | | | |
|---|---|---|---|---|
| Ingredients | Example 15 | Example 16 | Example 17 | Product H |
| Sodium sec-linear alkyl ($C_{12}$–$C_{15}$) benzene sulphonate | 0.02 | 0.02 | 0.02 | 0.02 |
| Sodium carbonate | 0.045 | 0.045 | 0.045 | 0.045 |
| Calcite (Calofort U50) | 0.05 | — | — | — |
| Vaterite[1] | — | 0.05 | 0.1 | — |
| Sodium tripolyphosphate[2] | 5 ppm | 5 ppm | 5 ppm | 5 ppm |

[1]The vaterite was prepared by adding a 1M solution of sodium carbonate to a 3M solution of calcium chloride at 30°C under limited agitation. The particle size of the precipitated vaterite had a determined surface area of about 10 m²/g
[2]The trace of sodium tripolyphosphate represents the impurities which are found in commercial products or extracted from domestically-soiled fabrics The wash solutions were used to determine the detergencies of the compositions in a Terg-O-Tometer at 50°C; the water contained 12°(Ca) hardness and the test cloth was artificially soiled with $C_{14}$ radio-active labelled sebum.

| Compositions | % detergency |
|---|---|
| Example 15 | 61 |
| Example 16 | 50 |
| Example 17 | 60 |
| Product H | 47 |

This shows that the use of vaterite gives some benefit, especially at the higher level, but it is still substantially less effective than the calcite of higher surface area.

In a further test it was shown that the presence of vaterite lowered calcium carbonate deposition on fabrics and washing machine parts, though again the effect was not as good as that obtained with the calcite of higher surface area. Similar results were obtained using aragonite, having a surface area of about 7 m²/g (Sturcal F obtained from J. and E. Sturge Limited). Results of the same order were also obtained when the alkyl benzene sulphonate was replaced by 0.012% of Tergitol 15-s-9, or 0.02% Dobanol 45 sulphate or $C_{14}-C_{18}$ olefin sulphonate, those with the latter two being generally somewhat better than the other.

EXAMPLE 18

A fully formulated particulate detergent composition was prepared by conventional slurry-making and spray drying techniques to the following formulation:

| Ingredients | % |
|---|---|
| Sodium sec-linear alkyl benzene sulphonate | 14.0 |
| Coconut ethanolamide[1] | 2.0 |
| Sodium carbonate | 21.0 |
| Calcite (Calofort U50) | 24.0 |
| Sodium alkaline silicate | 5.0 |
| Sodium perborate[1] | 20.0 |
| Sodium carboxymethylcellulose, fluorescers, perfume etc[1] | 3.6 |
| Water | to 100.0 |

[1]These ingredients were added to the composition after spray drying

This composition was tested against a conventional commercially available sodium tripolyphosphate-built detergent composition in confidential domestic consumer tests, when it was found that there was no significant preference for the results with either product.

EXAMPLES 19 to 21

Three detergent compositions were prepared with varying amounts of sodium carbonate and calcite as follows:

| Ingredients | Percentage | | |
|---|---|---|---|
| | 19 | 20 | 21 |
| Sodium sec-linear alkyl benzene sulphonate | 15 | 15 | 15 |
| Sodium alkaline silicate | 7.5 | 7.5 | 7.5 |
| Sodium carbonate | 34 | 19 | 19 |
| Calcite (Calofort U50) | 37.5 | 45 | 52.5 |
| Water | ← to 100 → | | |

The detergencies of the compositions were then compared by halved-article washing tests in Whirlpool washing machines using a product concentration of 0.2% in water of 6°H Ca at 50°C. The results showed that Example 19 gave the best detergency though the differences caused by the decreased sodium carbonate content with increased calcite levels in Examples 20 and 21 were marginal.

EXAMPLES 22 to 27

The procedure of Examples 11 to 14 was repeated except that different detergent active compounds were used as follows:

| Detergent active compound(s) | Ex 22 | 23 | 24 | 25 | 26 | 27 |
|---|---|---|---|---|---|---|
| Sodium alkyl ether sulphate[1] | 15 | — | — | — | — | — |
| Coco methyl dihydroxyethyl/ 15EO ammonium chloride[2] | — | 15 | — | — | — | — |
| Nonylphenol 10EO | — | — | 15 | — | — | — |
| Sodium sec-linear alkyl benzene sulphonate | — | — | — | 7.5 | — | — |
| Sodium tallow alcohol sulphate | — | — | — | 7.5 | — | — |
| Tergitol 15-S-9 | — | — | — | — | 7.5 | 6 |
| Dimethyl cocoamine oxide | — | — | — | — | 7.5 | — |
| Tergitol 15-S-3 | — | — | — | — | — | 4.5 |
| Lauric isopropanolamide | — | — | — | — | — | 4.5 |

[1]Prepared from Dobanol 25 – 3EO
[2]Ethoquad C/25 from Armour Chemical Company

The compositions were tested for inorganic deposition on cotton terry towelling and detergency as before, with the following results (3 wash cycles):

| EXamples | % inorganic deposition |
|---|---|
| 22 | 4.80 |
| 23 | 2.01 |
| 24 | 2.20 |
| 25 | 0.65 |
| 26 | 2.52 |
| 27 | 1.76 |

Again, the detergency tests (with halved articles using a product concentration of 0.2% in 12° Ca water at 50°C) showed general equivalence with comparative sodium tripolyphosphate-built products.

EXAMPLE 28

A commercially available sodium carbonate-built detergent composition containing 9% nonionic detergent compound, 55% sodium carbonate and 8% sodium silicate, was evaluated for anti-redeposition properties by washing a clean frabric 5 times in the presence of an artificially soiled test cloth. The test was done in a Terg-O-Tometer using a product concentration of 0.15% in water of 120 ppm Ca + Mg (2:1) at 120°F. The initial and final light reflectances of the clean fabric were measured to give by difference an indication of the soil redeposition after the 5 washes. The same procedure was repeated with the addition of 50% of Calofort U50, based on the amount of the detergent composition, to give the following results:

| | Loss in reflectance units after 5 washes |
|---|---|
| Composition alone | 19.7 |
| Composition with 50% calcite | 7.9 |

This shows a remarkable improvement in anti-redeposition properties for the composition with calcite.

EXAMPLE 29 to 33

A series of seven hand dishwashing powders including two comparative products J and K were prepared by admixture of the following ingredients:

| Ingredients | Percentage in each product | | | | | | |
|---|---|---|---|---|---|---|---|
| | J | 29 | 30 | K | 31 | 32 | 33 |
| Sodium linear sec-alkyl ($C_{11}$–$C_{15}$) benzene sulphonate[1] | 30 | 30 | 30 | 30 | 30 | 30 | 30 |
| Sodium carbonate | 10 | 10 | 10 | 20 | 20 | 20 | 20 |
| Calcite (Calofort U50) | 0 | 5 | 10 | 0 | 5 | 10 | 20 |
| Sodium sulphate | to 100 | | | | | | |

[1]Obtained as "Sirene X12L"

These products were compared against a further comparative conventional product L, which contained 10% sodium tripolyphosphate instead of the sodium carbonate and 5% of sodium bisulphate instead of the calcite, in standard dishwashing evaluation tests. In the plunger test 0.15% solutions of the products in either 4°H ($Ca^{++}$:Mg, 4:1) or 24°H ($Ca^{++}$:$Mg^+$, 10:1) water at 45°C were placed in a cylinder within which a plunger was moved and increments of a standard artificial soil containing fatty acids and triglycerides in a starch paste were added between strokes, and the number of strokes until the lather disappeared was then determined. The following results were obtained:

| Product | Plunger Scores | |
|---|---|---|
| | 4°H | 24°H |
| J | 29 | 29 |
| 29 | 24 | 38 |
| 30 | 21 | 32 |
| K | 28 | 37 |
| 31 | 19 | 37 |
| 32 | 16 | 37 |
| 33 | 14 | 40 |
| L | 33 | 33 |

It can be seen that the presence of the calcite is beneficial in hard water but not so in the soft water where the carbonate/calcite systems appear to be too effective in lowering calcium ion concentration for the purposes of this test. (Note that for optimum detergency the calcium ion concentration should be as low as possible but for optimum lather some low level of free calcium appears to be desirable.) These results were confirmed in plate washing tests in which the number of artificially soiled plates which could be washed before the lather disappeared was measured.

EXAMPLE 34

Two detergent compositions were prepared, one based on a synthetic detergent active compound and the other on soap (Product M), but otherwise similar, as follows:

| Ingredients | Example 34 | Product M |
|---|---|---|
| Sodium linear alkyl ($C_{11}$–$C_{15}$) benzene sulphonate | 15 | — |
| Sodium soap (80% tallow/20% coconut) | — | 15 |
| Sodium carbonate | 30 | 30 |
| Calcite (Calofort U50) | 37 | 37 |
| Sodium alkaline silicate | 8 | 8 |
| Water | to 100 | to 100 |

These products were then compared for detergency in a halved article washing test using a 0.2% product concentration in water of 18°H ($Ca^{++}$:$Mg^{++}$, 2:1) at 60°C in Whirlpool washing machines. A preference of 17 to 1 was found for the product of Example 34 over the soap-based product. Evaluation of standard artificially soiled test cloths showed that Example 34 had a detergency of 60.3% against a detergency of only 29.9% for the product M. It was confirmed that the soap in product M had not been kept in solution by the detergency builder systems, and was therefore ineffective.

EXAMPLES 35 to 42

A series of detergent compositions were prepared to the following formulation:

| Ingredients | Percentage |
|---|---|
| Tergitol 15-S-9 | 8 |
| Sodium carbonate | 30 |
| Calcite (Calofort U50) | 33.3 |
| Anionic detergent compound[1] | 3.3 |
| Water | to 100 |

[1]The anionic compounds were as follows:

| Example | Anionic Compound |
|---|---|
| 35 | None |
| 36 | Sodium α-sulphonated tallow fatty acids |
| 37 | Sodium linear alkyl ($C_{11}$–$C_{15}$) benzene sulphonate |
| 38 | Sodium linear alkyl ($C_{18}$) benzene sulphonate |
| 39 | Sodium soap (tallow:coconut, 80:20) |
| 40 | Sodium tallow alcohol sulphate |
| 41 | Sodium α-olefin (Zeigler $C_{18}$) sulphonate |
| 42 | Sodium alkenyl ($C_{16}$) succinate |

Cotton test cloths were then washed in these compositions using 0.15% product concentrations at 50°C in 12°H $Ca^{++}$ water and the % inorganic deposition was found after 10 repeated wash cycles to be as follows:

| Example | % deposition |
|---|---|
| 35 | 1.6 |
| 36 | 0.7 |
| 37 | 1.6 |
| 38 | 0.2 |
| 39 | 0.3 |
| 40 | 0.6 |
| 41 | 0.5 |
| 42 | 1.1 |

These results showed that most of the added anionic detergent compounds had a beneficial effect on inorganic deposition, but other tests on the same compositions showed that in some cases there was a drop in detergency; this was most noticeable with Example 36. When the corresponding calcium soap was used instead of the sodium soap of Example 39 the deposition was again decreased but there was no drop in detergency. For both the sodium and calcium soaps there was a noticeable improvement in the softness of the washed fabrics.

EXAMPLES 43 to 46

A series of detergent compositions were prepared with varying levels of sodium alkaline silicate as follows:

| Ingredients | % | | | |
|---|---|---|---|---|
| | Ex 43 | Ex 44 | Ex 45 | Ex 46 |
| Sodium linear alkyl ($C_{12}$–$C_{15}$) benzene sulphonate | 13.3 | 13.3 | 13.3 | 13.3 |
| Sodium carbonate | 30 | 30 | 30 | 30 |
| Calcite (Calofort U50) | 33.3 | 33.3 | 33.3 | 33.3 |
| Sodium alkaline silicate | 0 | 3.3 | 6.6 | 16.6 |

-continued

| Ingredients | Ex 43 | Ex 44 | Ex 45 | Ex 46 |
|---|---|---|---|---|
| Water | ← to 100 → | | | |

Additionally, 10 ppm of STP was present in the wash solution to simulate the calcium carbonate inhibitors found in domestically soiled clothes The detergencies of each of these products were determined by the Terg-O-Tometer test using a cotton test cloth artificially soiled with a radioactive sebum, at a product concentration of 0.15% in water of 18°H ($Ca^{++}$:$Mg^{++}$, 2:1) at 50°C. The detergencies of a series of similar products not containing any calcite were also determined, with the following results:

| Examples | % detergency with calcite | without calcite |
|---|---|---|
| 43 | 39 | 11 |
| 44 | 40 | 13 |
| 45 | 47 | 15 |
| 46 | 59 | 22 |

The benefit of the calcite and also of the increasing levels of sodium silicate are apparent.

EXAMPLES 47 to 53

The effect of using calcites of different surface areas was determined by preparing a series of compositions to the following formulation:

| Ingredients | % |
|---|---|
| Sodium linear alkyl ($C_{12}$–$C_{15}$) benzene sulphonate | 10 |
| Sodium carbonate | 22.5 |
| Calcite[1] | x[1] |
| Sodium alkaline silicate | 5 |
| Water | to 100 |

Additionally, 10 ppm of STP was present in the wash solution
[1]The amounts and types of calcite used in the Examples and two comparative products were as follows:

| Example | Calcite amount | Calcite type |
|---|---|---|
| 47 | 25 | Solvay product, nominal surface area 85 m²/g |
| 48 | 12.5 | " " " |
| 49 | 25 | Calofort U50, from J. & E. Sturge Ltd, nominal surface area 50 m²/g |
| 50 | 12.5 | " " " |
| 51 | 50 | Calofort U, from J. & E. Sturge Ltd, nominal surface area 25 m²/g |
| 52 | 25 | " " " |
| 53 | 25 | Calopake PC from J. & E. Sturge Ltd, nominal surface area 10 m²/g |
| Product N | 25 | Ground chalk, surface area about 0.1 m²/g |
| Product P | 0 | None |

The % detergencies were as follows (using the same test procedure as in Examples 43 to 46 but with a product concentration of 0.3%).

| Example | % detergency |
|---|---|
| 47 | 76 |
| 48 | 72 |
| 49 | 72 |
| 50 | 70 |
| 51 | 69 |
| 52 | 60 |
| 53 | 50 |
| Product N | 30 |
| Product P | 25 |

The benefit of using calcite of high surface area is readily apparent. Similar results were obtained using Purecal U (ex Wyandotte, surface area about 20 m²/g) or Solvay calcite (extra fine, surface area about 30 m²/g) instead of the Calofort U, or Pfizer calcite (surface area about 10 m²/g) instead of the Calopake PC.

EXAMPLES 54 to 59

A series of detergent compositions with different detergent active compounds were prepared to the following formulation:

| Ingredients | % |
|---|---|
| Detergent active compound[1] | 15 |
| Sodium carbonate | 33.75 |
| Calcite (Calofort U50) | 37.5 |
| Sodium alkaline silicate | 7.5 |
| Water | to 100 |

Additionally 10 ppm of STP was present in the wash solution.
[1]The detergent active compounds used were as follows, with the detergency results obtained using the same test method as in Examples 43 to 46 above (but with a product concentration of 0.2%) for the present Examples 54 to 60 and six comparative products in which the calcite was omitted

| Example | Detergent active compound | % detergency with calcite | without calcite |
|---|---|---|---|
| 54 | Mono methyl ester of sodium α-sulpho tallow fatty acids | 69 | 55 |
| 55 | Sodium acetoxy hexadecane sulphonate | 70 | 64 |
| 56 | Sodium hydroxyalkyl ($C_{14}$)-N-methyl taurate | 59 | 52 |
| 57 | Alkyl ($C_{14}$) sulphoxide - 7EO | 61 | 51 |
| 58 | 10.5% sodium linear alkyl ($C_{12}$–$C_{15}$) benzene sulphonate, & 4.5% tallow alcohol - 3EO sulphate | 71 | 48 |
| 59 | Tergitol 15-S-9 | 59 | 51 |

The benefit of the calcite is again apparent.

EXAMPLE 60

A detergent composition was prepared as follows:

| Ingredients | % |
|---|---|
| Sodium linear alkyl ($C_{12}$–$C_{15}$) benzene sulphonate | 15 |
| Potassium carbonate | 33.75 |
| Calcite (Calofort U50) | 37.5 |
| Sodium alkaline silicate | 7.5 |
| Water | to 100 |

Using the procedure of Examples 43 to 46 (but at a product concentration of 02%) the % detergency was found to be 68% whilst for a comparative product without the calcite the % detergency was only 31%.

EXAMPLES 61 to 64

A series of detergent compositions were prepared with various levels of ingredients as follows:

| Ingredients | % | | | |
|---|---|---|---|---|
| | Ex 61 | Ex 62 | Ex 63 | Ex 64 |
| Sodium linear alkyl ($C_{12}$–$C_{15}$) benzene sulphonate | 8 | 8 | 6 | 6 |
| Sodium carbonate | 10 | 30 | 25 | 75 |
| Calcite (Calofort U50) | 60 | 30 | 5 | 10 |
| Sodium alkaline silicate | 10 | 10 | 5 | 0 |
| Water | | | to 100 | |

Additonally, 10 ppm of STP was present in the wash soluton.

The detergencies of these products were then determined by the procedure of Examples 43 to 46 (using product concentrations of 0.25% for Examples 61 and 62 and 0.5% for Examples 63 and 64), together with the detergencies for four comparative products without the calcite.

| Example | % detergency | |
|---|---|---|
| | with calcite | without calcite |
| 61 | 21 | 16 |
| 62 | 38 | 28 |
| 63 | 43 | 35 |
| 64 | 72 | 49 |

EXAMPLES 65 to 67

Three detergent compositions were prepared to the formulation:

| Ingredients | % | | |
|---|---|---|---|
| | Ex 65 | Ex 66 | Ex 67 |
| Tergitol 15-S-9 | 8 | 8 | 8 |
| Sodium carbonate | 30 | 30 | 30 |
| Calcite (Calofort U50) | 33.3 | 33.3 | 33.3 |
| Sodium alkaline silicate | 6.6 | 6.6 | 6.6 |
| Sodium citrate | 3.3 | — | — |
| Sodium soap (tallow:coconut oil, 80:20) | — | 3.3 | — |
| Water | to 100 | to 100 | to 100 |

The detergencies were determined by the procedure of Examples 43 to 46 at 015% product concentration, together with the detergencies of comparative products without calcite, as follows:

| Examples | % detergency | |
|---|---|---|
| | with calcite | without calcite |
| 65 | 41 | 36 |
| 66 | 41 | 35 |
| 67 | 40 | 34 |

The benefit of the added calcite is readily apparent, but the additional citrate or soap as a supplementary builder gives only a marginal benefit.

EXAMPLE 68

A liquid detergent composition has the following formulation:

| Ingredients | % |
|---|---|
| Sodium linear alkyl benzene sulphonate | 8 |
| Lauric diethanolamide | 2 |
| Sodium coco-soap | 1 |
| Sodium carbonate | 15 |

-continued

| Ingredients | % |
|---|---|
| Calcite (Calofort U50) | 15 |
| Sodium xylene sulphonate | 5 |
| Sodium silicate | 3 |
| Sodium carboxymethylcellulose | 0.3 |
| Water | to 100 |

The composition has an adequate detergency, especially when used at high product concentrations.

EXAMPLES 69 and 70

A detergent composition was prepared with the following formulation:

| Ingredients | % |
|---|---|
| Sodium alkyl benzene sulphonate | 13.3 |
| Sodium carbonate | 16.6 |
| Sodium bicarbonate | 16.6 |
| Calcite (Calofort U50) | 33.3 |
| Sodium alkaline silicate | 6.6 |
| Water | to 100 |

Additionally, 10 ppm of STP was present in the wash solution concentration The detergency was determined by the procedure of Examples 43 to 46 (product concentrations 015%) in comparison with that for a similar product (Example 70) with sodium carbonate instead of the sodium bicarbonate, and with and without calcite.

| Examples | % detergency | |
|---|---|---|
| | with calcite | without calcite |
| 69 | 43.0 | 16.2 |
| 70 | 50.5 | 32.8 |

This shows that sodium bicarbonate is not so effective as sodium carbonate, though the composition still washes adequately with the calcite present.

EXAMPLE 71

A low sudsing product was made to the following formulation:

| Ingredients | % |
|---|---|
| Sodium linear alkyl ($C_{11}$–$C_{15}$) benzene sulphonate | 8.0 |
| Sodium soap (80% tallow, 20% coconut oil) | 2.0 |
| Tallow alcohol - 11EO | 1.0 |
| Sodium carbonate | 39.0 |
| Calcite (Calofort U50) | 30.0 |
| Sodium alkaline silicate | 10.0 |
| Sodium carboxymethylcellulose | 0.5 |
| Water | 9.5 |
| | 100.0 |

This composition was tested for inorganic deposition on fabrics and also for detergency in a Lavamat automatic washing machine with water of 24°H ($Ca^{++}$) with recommended dosage at both medium temperatures (60°C) and at high temperatures (95°C). The % inorganic deposits were as follows after 5 repeated wash cycles:

| | 60°C | 95°C |
|---|---|---|
| Cotton sheeting | 1.59 | 0.91 |
| Cotton terry towelling | 1.72 | 0.78 |

The detergency test (halved articles) showed general equivalence with a commercially available high STP detergent powder (1 preference for Example 71, 3 preferences for the comparative STP product and 14 no differences).

EXAMPLE 72

The effect of calcite level on the inorganic deposition on cotton fabric was determined by preparing a series of compositions to the following formulation:

| Ingredient | % |
|---|---|
| Detergent active compound | 13.3 |
| Sodium carbonate | 30.0 |
| Calcite (Calofort U50) | x |
| Water | to 100 |

The compositions were tested for the levels of precipitated inorganic deposition (i.e. excluding deposited Calofort U50) in terg-o-tometer tests using a product concentration of 0.15% in 12°H ($Ca^{++}$) water radio-active labelled with $Ca^{45}$, at 50°C. The levels of calcite used were as follows, with the detergent active compound being either anionic (sodium sec-linear alkyl ($C_{11}$–$C_{15}$) benzene sulphonate) or nonionic (Tergitol 15-S-9), or for comparative purposes with no detergent active compound, to give the levels of deposition shown:

| % calcite | % inorganic deposition | | |
|---|---|---|---|
| | Anionic | Nonionic | None |
| 0 | 16.7 | 6.0 | 8.3 |
| 6.7 | 10.9 | 4.7 | 4.5 |
| 13.3 | 8.9 | 3.2 | 2.9 |
| 20 | 4.9 | 2.6 | 3.1 |
| 26.7 | 1.4 | 2.1 | 3.1 |
| 33.3 | 0.3 | 1.7 | 2.0 |

These results show the benefit of having high levels of calcite present.

What is claimed is:

1. A detergent composition comprising from about 5 to about 40% of a detergent active compound selected from the group consisting of an anionic active which does not form an insoluble calcium salt during use, a nonionic active, an amphoteric active, a zwitterionic active and mixtures thereof, from about 10 to about 75% of sodium or potassium carbonate, and from about 5 to about 60% of finely divided precipitated calcium carbonate prepared by passing carbon dioxide into a suspension of calcium hydroxide, said calcium carbonate having a surface area of about 30 to about 100 square meters per gram ($m^2/g$), the percentages being expressed by weight of the composition.

2. A composition according to claim 1, wherein the amount of the detergent active compound is from about 10 to about 25% by weight of the composition.

3. A composition according to claim 1, wherein the amount of the sodium or potassium carbonate is from about 20 to about 60% by weight of the composition.

4. A composition according to claim 1, wherein the amount of the calcium carbonate is from about 20 to about 50% by weight of the composition.

5. A composition according to claim 4, wherein the amount of the calcium carbonate is from about 25 to about 40% by weight of the composition.

6. A composition according to claim 1, wherein the calcium carbonate is in the form of calcite.

7. A composition according to claim 1, additionally comprising from about 5 to about 30% of sodium silicate, by weight of the composition, the total amount of the sodium or potassium carbonate and the sodium silicate being not more than about 85% by weight of the composition.

8. A composition according to claim 7, wherein the amount of sodium silicate is from about 10 to about 20% by weight of the composition.

9. A composition according to claim 1, wherein the detergent active compound is an anionic active compound which does not form an insoluble calcium salt during use.

10. A composition according to claim 9, wherein the detergent active compound is sodium linear secondary alkyl ($C_{11}$–$C_{15}$) benzene sulphonate.

11. A composition according to claim 10, which additionally comprises a solubilising nonionic, alkyl sulphate or alkyl ether sulphate detergent active compound, wherein the ratio of the solubilising compound or compounds to the alkyl benzene sulphonate is from about 1:1 to about 1:10.

12. A composition according to claim 1, wherein the detergent active compound is a nonionic detergent active compound.

13. A composition according to claim 12, which additionally comprises from about 1 to about 10% by weight of soap or a synthetic long-chain (at least $C_{16}$) anionic detergent compound which forms an insoluble calcium salt.

14. A composition according to claim 1, additionally comprising from about 0.5 to about 20% by weight of a crystallisation aid which decreases the calcium ion concentration during use of the composition.

15. A composition according to claim 14, wherein the amount of the crystallisation aid is at least about 10% by weight of the amount of the calcium carbonate.

16. A composition according to claim 14, wherein the crystallisation aid is phenol or sodium benzoate.

17. A composition according to claim 1, comprising not more than about 0.5% by weight of sodium tripolyphosphate.

18. A detergent composition comprising from about 5 to about 40% of a detergent active compound selected from the group consisting of an anionic active which does not form an insoluble calcium salt during use, a nonionic active, an amphoteric active, a zwitterionic active and mixtures thereof, from about 20 to about 60% of sodium or potassium carbonate and from about 20 to about 50% of finely divided precipitated calcite prepared by passing carbon dioxide into a suspension of calcium hydroxide, said calcite having a surface area of about 20 to about 100 square meters per gram ($m^2/g$), the percentages being expressed by weight of the composition.

19. A composition according to claim 18, wherein the amount of the detergent active compound is from about 10 to about 25% by weight of the composition.

20. A composition according to claim 18, wherein the amount of the calcite is from about 25 to about 40% by weight of the composition.

21. A composition according to claim 18, wherein the calcite has a surface area of from about 30 to about 100 $m^2/g$.

22. A compositon according to claim 18, additionally comprising from about 5 to about 30% of sodium silicate, by weight of the composition, the total amount of the sodium or potassium carbonate and the sodium silicate being not more than about 85% by weight of the composition.

23. A composition according to claim 22, wherein the amount of sodium silicate is from about 10 to about 20% by weight of the composition.

24. A composition according to claim 18, wherein the detergent active compound is an anionic compound.

25. A composition according to claim 24, wherein the detergent active compound is sodium linear secondary alkyl ($C_{11}$–$C_{15}$) benzene sulphonate.

26. A composition according to claim 25, which additionally comprises a solubilising nonionic, alkyl sulphate or alkyl ether sulphate detergent active compound, wherein the ratio of the solubilising compound or compounds to the alkyl benzene sulphonate is from about 1:1 to 1:10.

27. A composition according to claim 18, wherein the detergent active compound is a nonionic detergent active compound.

28. A composition according to claim 27, which additionally comprises from about 1% to about 10% by weight of soap or a synthetic long-chain (at least $C_{16}$) anionic detergent compound which forms an insoluble calcium salt.

29. A composition according to claim 18, comprising not more than about 0.5% by weight of sodium tripolyphosphate.

30. A composition according to claim 24, wherein the detergent active compound is an alkali metal ($C_{10}$–$C_{18}$) alkyl ether (1–10 EO) sulphate.

* * * * *